United States Patent [19]

Funatsu et al.

[11] Patent Number: 4,926,328
[45] Date of Patent: May 15, 1990

[54] METHOD OF CONTROLLING TRANSMISSION FOR VEHICLE

[75] Inventors: Koichi Funatsu; Hiromi Aida, both of Utsunomiya, Japan

[73] Assignee: Honda Giken Kogyo Kabushiki Kaisha, Tokyo, Japan

[21] Appl. No.: 148,738

[22] Filed: Jan. 27, 1988

[30] Foreign Application Priority Data

Jan. 29, 1987 [JP] Japan ................. 62-17242

[51] Int. Cl.$^5$ ............ B60K 41/18; G06F 15/20; F16H 5/66
[52] U.S. Cl. .................... 364/424.1; 74/866
[58] Field of Search ............. 364/424.1; 74/866, 867, 74/868, 869

[56] References Cited

U.S. PATENT DOCUMENTS

| | | | |
|---|---|---|---|
| 4,391,166 | 7/1983 | Kubo et al. | 74/869 |
| 4,468,987 | 9/1984 | Miller | 74/869 X |
| 4,523,281 | 6/1985 | Noda et al. | 364/424.1 |
| 4,669,335 | 6/1987 | Matsuoka et al. | 74/866 |
| 4,698,763 | 11/1987 | Smyth | 364/424.1 |
| 4,726,262 | 2/1988 | Hayakawa et al. | 74/866 |
| 4,733,580 | 3/1988 | Kubo et al. | 74/866 |
| 4,777,848 | 10/1988 | Taga et al. | 74/866 |

FOREIGN PATENT DOCUMENTS

| | | |
|---|---|---|
| 59-166750 | 9/1984 | Japan . |
| 61-80251 | 4/1986 | Japan . |
| 61-84450 | 4/1986 | Japan . |
| 61-127956 | 6/1986 | Japan . |

OTHER PUBLICATIONS

1984 Toyota-Camry Owners Manual, pp. 48, 49 of interest.

Primary Examiner—Felix D. Gruber
Attorney, Agent, or Firm—Armstrong, Nikaido, Marmelstein, Kubovcik & Murray

[57] ABSTRACT

The present invention is directed to a method and apparatus for controlling an automatic transmission. A selector selects a first speed change range or a second speed change range in which the first and second speed change ranges effect speed changes at different points as a function of vehicle operating conditions. A microprocessor having a memory stores predetermined speed change patterns for the first and second speed change ranges and sensors are coupled to the microprocessor for sensing at least two vehicle operating conditions. The microprocessor controls the operation of the transmission in accordance with the vehicle operating conditions and the state of the selector. A selectively operable inhibiting device inhibits the transmission from operating in the maximum speed stage when the transmission is operating in the second speed change range.

1 Claim, 7 Drawing Sheets

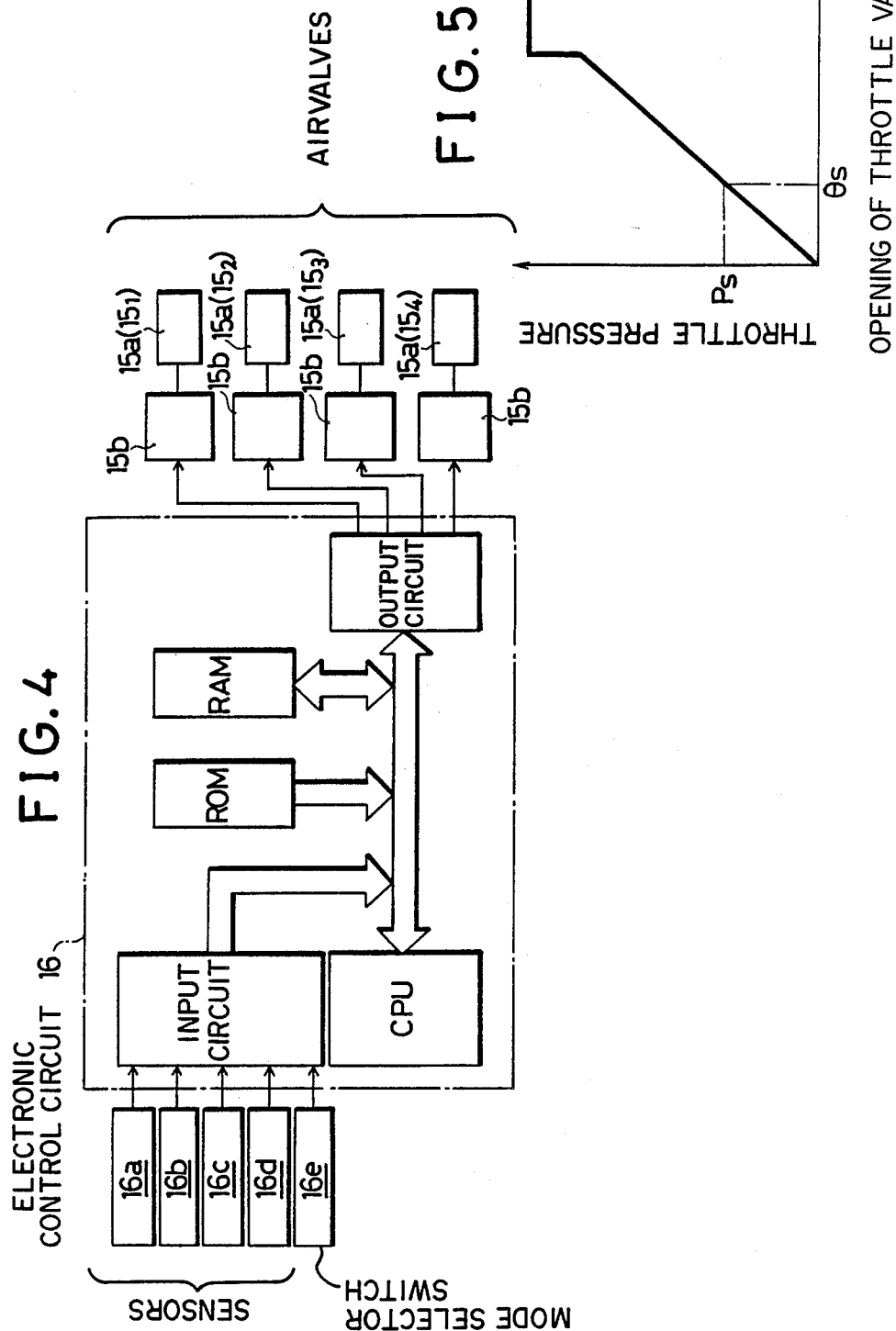

D POSITION

S POSITION

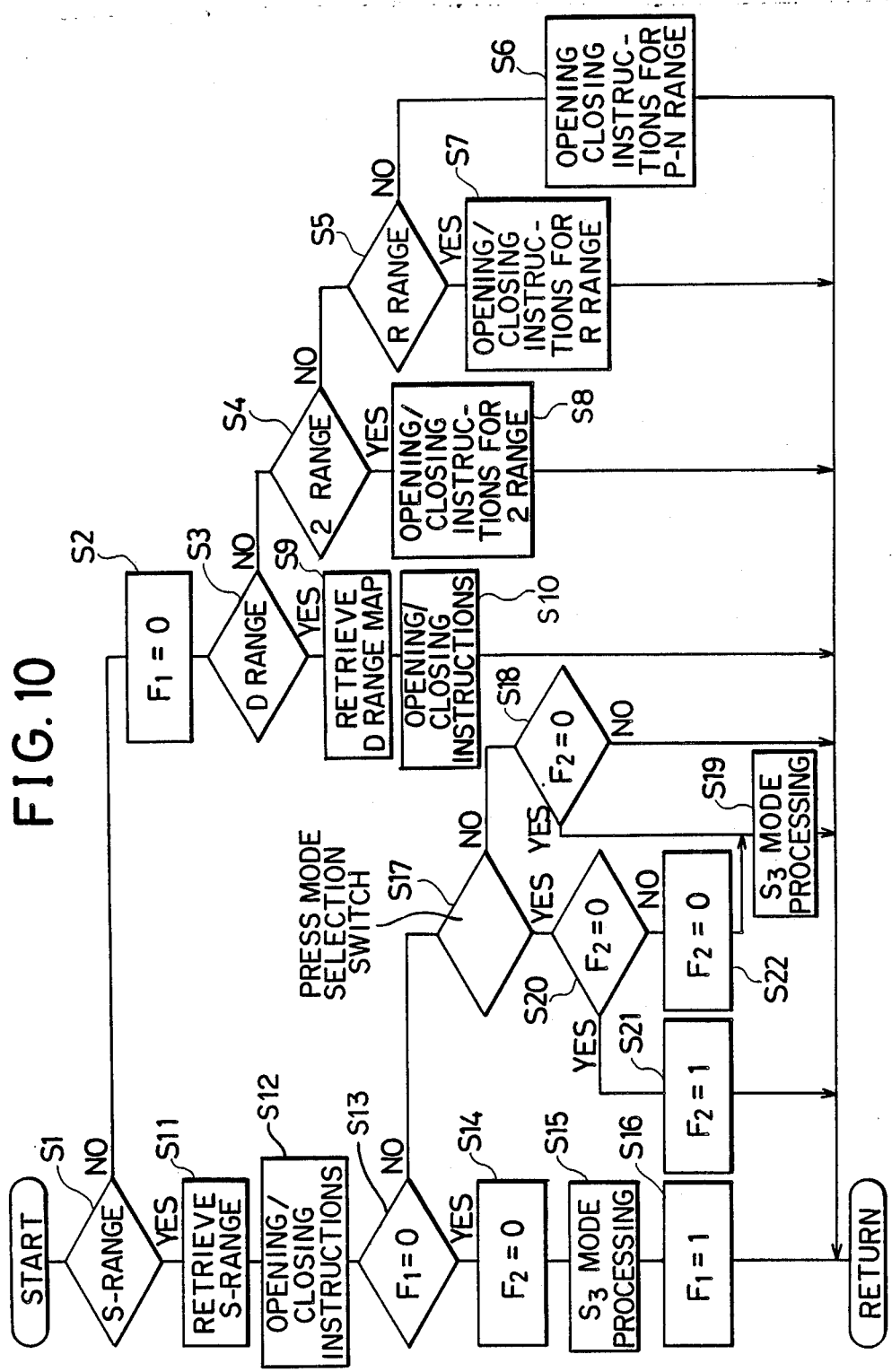

METHOD OF CONTROLLING TRANSMISSION FOR VEHICLE

BACKGROUND OF THE INVENTION

The present invention relates to a method and apparatus for controlling the transmission of a vehicle wherein the shifting of the transmission is controlled by means of an electronic control circuit.

The laid-open publication of Japanese Application No. 84450/1986 discloses a four-speed transmission of a purely hydraulic control type which is adapted to effect a speed change or shifting by changing over a shift valve by means of throttle pressure corresponding to the throttle opening of the engine and governor pressure corresponding to the vehicle speed. The transmission has a first automatic speed-change range and a second automatic speed-change range. In the just-described structural arrangement, when the first automatic speed-change range has been selected, an automatic speed-change or shifting from a first-speed stage or the lowest speed up to a fourth-speed stage, or the highest speed is effected or takes place in accordance with a predetermined speed change characteristic responsive or relative to the running condition of the vehicle. As with the above-described structural arrangement, when the second automatic speed-change range has been selected, the automatic speed change or shifting from the first-speed stage up to the third-speed stage is effected or takes place in accordance with the same speed-change characteristics as in the first automatic speed-change range, except that the third-speed stage is continuously held even in the range where the fourth-speed stage is usually established. Thus, when a need arises to reduce the speed while in high-speed running at the fourth-speed stage in the first automatic speed-change range, the third-speed stage is established by changing over to the second automatic speed-change range, thereby enabling engine braking to be applied.

Transmissions which use an electronic control circuitry such as a microcomputer to change over the shift valve for a speed change operation have recently been developed because such a control system makes it easier to carry out a finer speed change control according to the running state of a vehicle and to change the speed-change characteristics according to the type of vehicle. In an electronic control-type transmission, when two automatic speed-change ranges are provided, as described above, it becomes possible to effect an automatic speed change in each range according to its specific speed-change characteristics, the characteristics of each range being different from the other. In this case, it is desirable to make it possible to effect an automatic speed change from the first-speed stage up to the fourth-speed stage in the second automatic speed-change range as well, thereby allowing the user to select speed-change characteristics in accordance with his or her own preference.

SUMMARY OF THE INVENTION

It is the primary object of the present invention to provide a method and apparatus for controlling an automatic transmission for a vehicle, the transmission having a first speed range and a second speed range and means for selecting whether the transmission operates in the first speed range or the second speed range.

It is another object of the present invention to provide an inhibition mode of operation in which during high speed driving at the maximum speed stage in the first speed change range, the transmission can be shifted to the next to the maximum speed stage in the second speed change range thereby providing engine braking as a result of the down shift.

The present invention is directed to a method and apparatus for controlling an automatic transmission. A selector selects a first speed change range or a second speed change range in which the first and second speed change ranges effect speed changes at different points as a function of vehicle operating conditions. A microprocessor having a memory stores predetermined speed change patterns for the first and second speed change ranges and sensors are coupled to the microprocessor for sensing at least two vehicle operating conditions. The microprocessor controls the operation of the transmission in accordance with the vehicle operating conditions and the state of the selector. A selectively operable inhibiting device inhibits the transmission from operating in the maximum speed stage when the transmission is operating in the second speed change range.

BRIEF DESCRIPTION OF THE DRAWINGS

FIG. 4 is a block diagram of an electronic control circuit for effecting speed-change control and the control of the operation of a clutch for a fluid torque converter;

FIG. 5 is a diagram of output characteristics of a throttle valve disposed in the hydraulic circuit;

FIG. 10 is a flowchart of a speed-change or shift control routine of the present invention.

DETAILED DESCRIPTION OF THE PREFERRED EMBODIMENT

Figure 1:
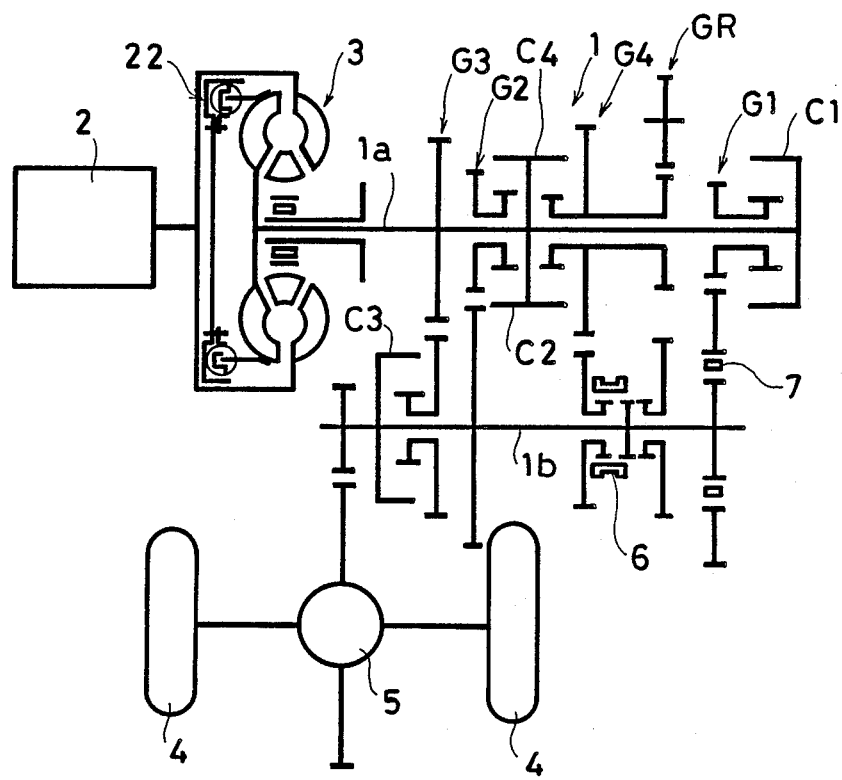
FIG. 1 is a diagram of a transmission for a vehicle to which the present invention is applied.

Referring to FIG. 1, a transmission 1 for carrying out the changing or shifting of a vehicle speed to four forward speeds and one reverse speed comprises first to fourth forward speed transmission trains, G1, G2, G3, G4 and a reverse transmission train GR provided between an input shaft 1a connected to an engine 2 via a hydraulic torque converter 3 and an output shaft 1b, connected to the driving wheels 4 of a vehicle via differential gear 5. The forward speed transmission trains G1, G2, G3, G4 have first to fourth speed hydraulic clutches C1, C2, C3, C4, each constituting a hydraulic engaging element and interposed respectively therein, so that the transmission trains G1, G2, G3, G4 may be selectively established by the engagement of the respective hydraulic clutches C1, C2, C3, C4. The reverse transmission train GR and the fourth-speed transmission train G4 commonly use the fourth speed hydraulic clutch G4. These transmission trains G4, GR are established selectively by shifting a selector gear 6, which is mounted on the output shaft 1b, to a forward position shown on the left-hand side on the drawing, and to a reverse position shown on the right-hand side on the drawing.

A one-way clutch 7 is interposed in the first speed transmission train G1 and adapted to operate so as to allow the over-rotation of the output shaft $1b$.

Figure 2:
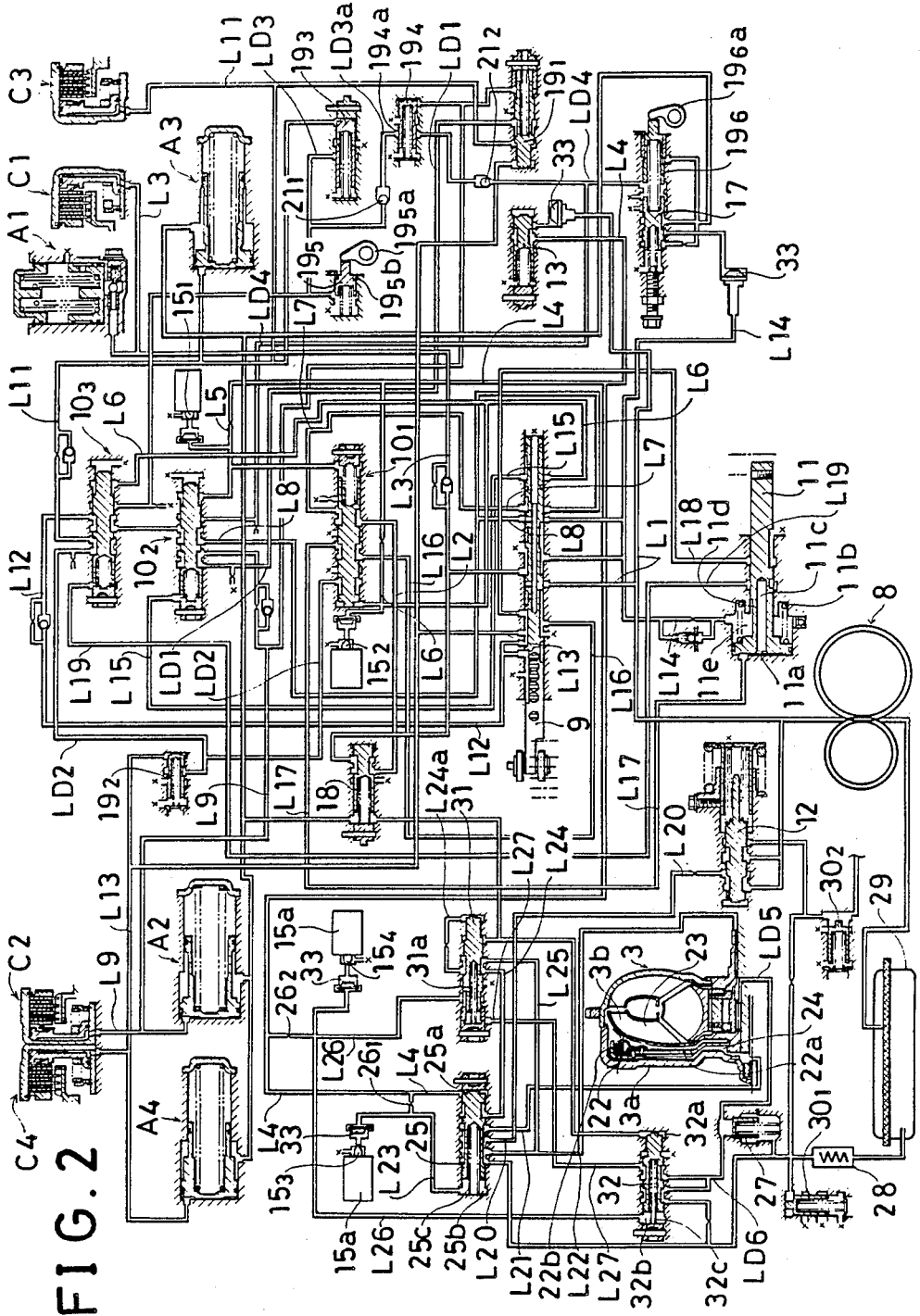
FIG. 2 is a hydraulic circuit diagram thereof.
Figure 3:
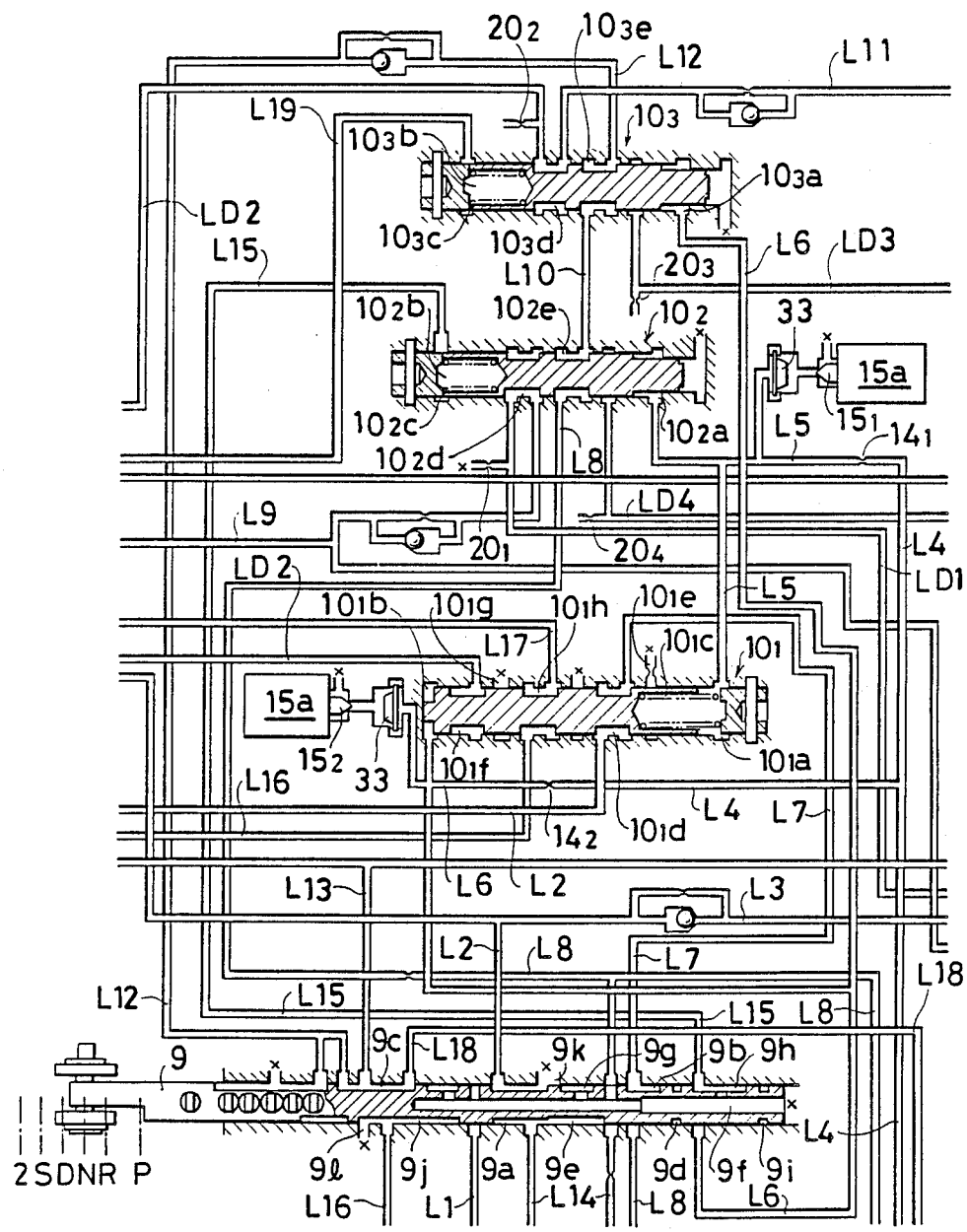
FIG. 3 is an enlarged view of a manual valve and a shift valve thereof.

The supplying and discharging of the oil to and from the hydraulic clutches C1, C2, C3, C4 is controlled by the hydraulic circuit shown in FIG. 2. This will now be described in detail. The hydraulic circuit is provided with a hydraulic power source 8; a manual valve 9 switchable by a range change over lever (not shown) to the six positions clearly shown in FIG. 3, namely a parking position P, a reverse position R, a neutral position N, automatic speed changing positions D and S and a second speed retaining position 2; a first shift valve $10_1$ for changeover between first and second speeds, a second shift valve $10_2$ for changeover between second and third speeds, a third shift valve $10_3$ for changeover between third and fourth speeds, and a servo valve 11 for switchover between forward and reverse drives, with the servo valve being connected to the selector gear 6. In the D range with the manual valve 9 set to the D position, No. 1 oil passage L1 communicating with the hydraulic power source 8 is connected via an annular groove $9a$ of the valve 9 to No. 2 oil-passage L2 which communicated with the first shift valve $10_1$, so that pressure oil having the pressure regulated to a predetermined line pressure by a regulator valve 12 is supplied from the No. 1 oil passage L1 to the No. 2 oil passage L2 and, consequently, the supplying of the oil to the first speed hydraulic clutch C1 through No. 3 oil passage L3 which branches off from the No. 2 oil passage L2, and the supplying of the oil to the second to fourth speed hydraulic clutches C2, C3, C4, through the first to third shift valves $10_1$, $10_2$, $10_3$ are carried out.

The first shift valve $10_1$ is formed so as to be switchable to the right-hand first speed position and the left-hand second speed position. The second shift valve $10_2$ is switchable to the right-hand second speed position and the left-hand third speed position. The third shift valve $10_3$ is switchable to the right-hand third speed position and the left-hand fourth speed position. A modulated pressure (a predetermined pressure lower than the line pressure) from a modulator valve 13 connected with the No. 1 oil passage L1 is inputted into the right end oil chambers $10_1a$, $10_a$ in the first and the second shift valves $10_1$, $10_2$ through No. 5 oil passage L5, which communicates with No. 4 oil passage L4 on the output side of the modulator valve 13 via an orifice $14_1$, and into an left-end oil chamber $10_1b$ in the first shift valve $10_1$ and an right-end oil chamber $10_3a$ in the third shift valve $10_3$ through No. 6 oil passage L6 which communicated with the No. 4 oil passage L4 via another orifice $14_2$. An electromagnetic, normally closed, type first open-air valve $15_1$ is connected to the No. 5 oil passage L5, and an electromagnetic, normally closed type, second open-air valve $15_2$ to the No. 6 oil passage L6, so that these shift valves $10_1$, $10_2$, $10_3$ may be switched as described in the following according to each selected speed by opening and closing the two open-air valves $15_1$, $15_2$.

At the first speed, the first open-air valve $15_1$ is opened and the second open-air valve $15_2$ is closed. As a result, the inputting of the modulator pressure into the right-end oil chambers $10_1a$, $10_2a$ in the first and second shift valves $10_1$, $10_2$ is discontinued and the modulator pressure is inputted into the left-end oil chamber $10_1b$ in the first shift valve $10_1$ and the right-end oil chamber $10_3a$ in the third shift valve $10_3$. Consequently, the first shift valve $10_1$ is switched to the right-hand first speed position against a right end spring $10_1c$, the second shift valve $10_2$ is switched to the right-hand second speed position by the resilient force of a left-end spring $10_2c$, applied thereto, and the third shift valve $10_3$ is switched to the left-hand fourth speed position against a left end spring $10_3c$. In this condition, the communication between the second oil passage L2 on the inlet side of the first shift valve $10_1$ and a seventh oil passage L7 on the outlet side thereof is discontinued, and the oil is supplied to the first speed hydraulic clutch C1 along through the third oil passage L3, so that the first speed transmission train G1 is established.

At the second speed, both the first and second open-air valves $15_1$, $15_2$ are opened. As a result, the inputting of the modulator pressure into the left end oil chamber $10_1b$ in the first shift valve $10_1$ and the right end oil chamber $10_3a$ in the third shift valve $10_3$ is discontinued, and the first and third shift valves $10_1$, $10_3$ are switched to the left-hand second speed position and right-hand third speed position, respectively by the resilient force of the springs $10_1c$, $10_3c$ applied thereto while the second shift valve $10_2$ is retained in the second speed position in the same manner as mentioned above. In this condition, the No. 2 oil passage L2 is communicated with No. 7 oil passage L7 through an annular groove $10_1d$ in the first shift valve $10_1$. The oil is, thus, supplied to the second speed hydraulic clutch C2 through No. 8 oil passage L8, which is communicated with the No. 7 oil passage L7 via a groove $9b$ in the manual valve 9 when the valve 9 is in the D range, and through the No. 9 oil passage L9, which is communicated with the No. 8 oil passage L8 via an annular groove $10_2d$ in the second shift valve $10_2$ when the valve $10_2$ is in the second speed position so that the second speed transmission train G2 is established. In this case the transmission of power via the first speed transmission train G1 is stopped automatically due to the operation of the one-way clutch 7.

At the third speed, the first open-air valve $15_1$ is closed, and the second open-air valve $15_1$ is opened. As a result, the modulator pressure is inputted into the right-end oil chambers $10_1a$, $10_2a$ in the first and second shift valves $10_1$, $10_2$, and the second shift valve $10_2$ is switched over to the left-hand third speed position against the spring $10_2c$ with the first and third shift valves $10_1$, $10_3$ being retained in the second and third speed positions. In this condition, the No. 8 oil passage L8 is communicated with No. 10 oil passage L10, which is communicated with the third shift valve 103 through an annular groove $10_2e$ in the second shift valve $10_2$, and the oil is supplied to the third speed hydraulic clutch C3 through No. 11 oil passage 11, which is connected via an annular groove $10_3d$ in the third shift valve $10_3$ with the No. 10 oil passage L10 when the third shift $10_3$ is in the third speed position. Also, the No. 9 oil passage L9 communicating with the second speed hydraulic clutch C2 is communicated with No. 1 discharge oil passage LD1 via the annular groove $10_2d$ in the second shift valve $10_2$, so that the discharging of the oil from the third speed transmission train G3 is established.

At the fourth speed, both the first and second open-air valves $15_1$, $15_2$ are closed. As a result, the first and second shift valves $10_1$, $10_2$ are retained in the second and the third speed positions, respectively, in the same manner as at the third speed, and the third shift valve $10_3$ is switched over to the left-hand fourth speed position by virtue of the modulator pressure inputted into the right-end oil chamber $10_3a$ in the third shift valve $10_3$. As for the first shift valve $10_1$, it is kept retained at the second speed position by the resilient force of the spring $10_1c$, in that the modulator pressure inputted into the oil chambers $10_1a$, $10_1b$ located at both ends thereof makes the left-side and right-side pressing forces resulting from the modulator pressure balanced between each other. In this condition, the No. 10 oil passage L10 is connected with No. 12 oil passage L12 through an annular groove $10_3e$ in the third shift valve $10_3$, and the oil is supplied to the fourth speed hydraulic clutch C4 through No. 13 oil passage L13 which gets connected with the No. 12 oil passage L12 through a groove 9c in the manual valve 9 when the manual valve 9 is in the D position. Also, the No. 11 oil passage L11 communicating with the third speed hydraulic clutch C3 is communicated with a second discharge oil passage LD2 through the annular groove $10_3d$ in the third shift valve $10_3$, so that the discharging of the oil from the third speed hydraulic clutch C3 is carried out, whereby the fourth speed transmission train G4 is established.

When the fourth speed is shifted down to the third speed, the No. 12 oil passage L12 is connected, through the annular groove $10_3e$ in the third shift valve $10_3$ which is in the third speed position, to the No. 3 discharge oil passage LD3 to discharge the oil from the fourth speed hydraulic clutch C4. When the third speed is shifted down to the second speed, the No. 10 oil passage L10 communicated with the No. 11 oil passage L11 through the annular groove $10_3d$ in the third shift valve $10_3$ which is in the third speed position is communicated with No. 4 discharge oil passage LD4 through the annular groove $10_2e$ in the second shift valve $10_2$ which is in the second speed position so as to discharge the oil from the third speed hydraulic clutch C3. When the second speed is shifted down to the first speed, the No. 7 oil passage L7, which is communicated with the second oil passage L2 at the second speed as mentioned above is communicated with an oil discharge port $10_1e$ through the annular groove $10_1d$ in the first shift valve $10_1$ as the operation to switch over the first shift valve $10_1$ to the first speed position is performed, so that the discharging of the oil from the second speed hydraulic clutch C2 is carried out through the No. 9, No. 8 and No. 7 oil passages since the No. 7 oil passage L7 is communicated with the second speed hydraulic clutch C2 through the No. 8 and No. 9 oil passages L8, L9 in the same manner as at the second speed.

Figure 6:
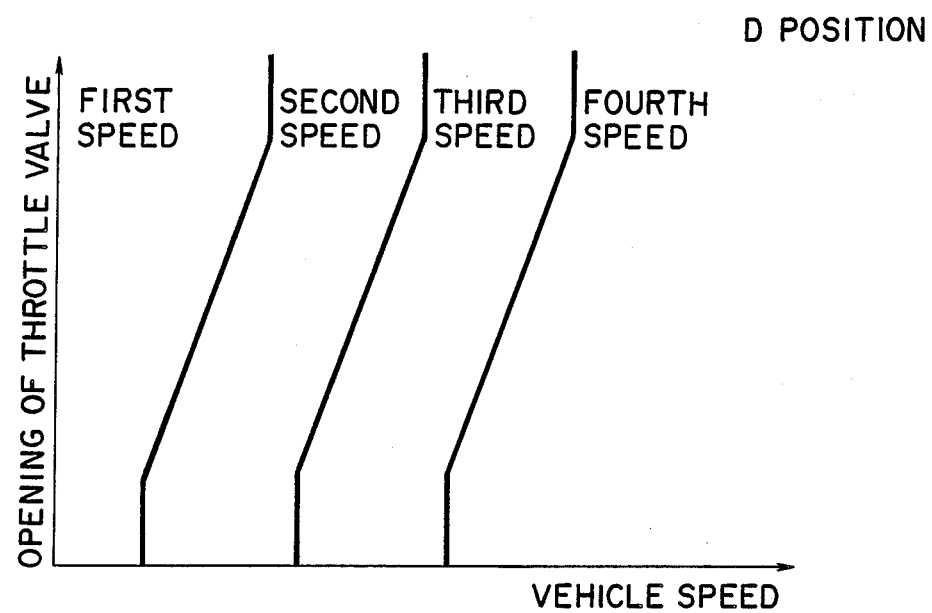
FIGS. 6 and 7 are diagrams of speed-change characteristics in a D range and an S range of the transmission.

As described above, with the manual valve 9 in the D range, the first to fourth speed transmission trains are selectively established by opening and closing the first and second open air valves $15_1$, $15_2$, and a signal from an engine's throttle valve opening sensor 16a (or a signal representative of the negative pressure in the intake passage relative to the engine load may also be used), a signal from a vehicle speed sensor 16b and a signal from a position sensor 16c for the range changeover lever are inputted into an electronic control circuit consisting of a microcomputer as shown in FIG. 4, so that the opening and closing of the open-air valves $15_1$, $15_2$ are controlled by the control circuit 16 in such a way that the speed change characteristics shown in, for example, FIG. 6 can be obtained. Furthermore, a signal from an engine revolution sensor for control of clutch 22, which will be described later, and a signal from a mode selector switch 16e, which will also be described later, are also provided as inputs to the electronic control circuit.

Referring to the drawings, reference symbols A1, A2, A3, A4 denote accumulators provided so as to lessen a sudden pressure variation during the supplying and discharging of the oil to and from the hydraulic clutches C1, C2, C3, C4. A throttle valve 17 is adapted to regulate a line pressure, which is inputted from No. 14 oil passage L14 communicating with the No. 1 oil passage L1 through the manual valve 9, to such a throttle pressure as shown in FIG. 5 according to the degree of opening of the throttle valve, and then output the resultant line pressure. The throttle pressure from the throttle valve 17 is applied as a back pressure to the second to fourth speed accumulators A2, A3, A4. A reducing valve 18 adapted to be pressed toward the right-hand opening side by the throttle pressure is interposed in the second oil passage L2 so as to reduce the pressure, which is supplied to the downstream side of the No. 2 oil passage L2, in the region of a low degree of opening of the throttle. This reducing valve 18 is known from Japanese Patent Laid-open No. 166750/1984, and a detailed description thereof will be omitted herein.

The discharge oil passages LD1, LD2, LD3, LD4 are provided therein with the discharge oil control valves $19_1$, $19_2$, $19_3$, $19_4$ and orifices $20_1$, $20_2$, $20_3$, $20_4$ which are disposed in parallel with the valves $19_1$–$19_4$, so that the resistances in the discharge oil passages LD1, LD2, LD3, LD4 can be increased and decreased by closing and opening the control valves $19_1$, $19_2$, $19_3$, $19_4$.

This will now be described more in detail. The second discharge oil control valve $19_2$, which is interposed in the second discharge oil passage LD2 connected to the third speed hydraulic clutch C3 when the third speed is shifted up to the fourth speed is pressed toward the left-hand opening side by the hydraulic pressure (which will hereinafter be referred to as fourth speed pressure) from the fourth speed hydraulic clutch C4 on the engaged side. When the third speed is shifted up to the fourth speed, the fourth speed pressure increases to a predetermined level to open the control valve $19_2$, so that there can be caused a difference in sharpness of the pressure dropping characteristic of the hydraulic pressure (which will hereinafter be referred to as third speed pressure) in the third speed hydraulic clutch C3 on the disengaged side between before and after opening of the valve $19_2$. Thus, the time for disengaging the third speed hydraulic clutch C3 is properly controlled, so that the speed change can be carried out smoothly without causing engine racing and the stalling of the engine attributable to an excessive concurrent coupling of the clutches. When the fourth speed is shifted down to the third speed, the third discharge oil control valve $19_3$ interposed in the third discharge oil passage LD3 which is connected to the fourth speed clutch C4 is pressed toward the left-hand opening side by the third speed pressure at the engaged side and opened due to the increased third speed pressure. The control valve $19_3$ thus functions to carry out the fourth to third speed shift down operation smoothly in the same manner as mentioned above. Under certain travelling conditions, for example, when the accelerator is suddenly operated, the speed change characteristics are set so that the speed is changed between the second and fourth speeds skipping over the third speed. To smoothly carry out such a speed changing operation, the first discharge oil control valve $19_1$ provided in the first discharge oil passage LDI which corresponds to the second speed hydraulic clutch C2 is adapted to be pressed toward the right-hand opening side by the third speed pressure and fourth speed pressure as known from Japanese Patent Laid-open No. 84450/1986, in such a manner that the control valve $19_1$ can deal with both a second to third speed increasing action and a second to fourth speed increasing action. The control valve $19_1$ is also adapted to be pressed toward the left-hand closing side by the hydraulic pressure (which will hereinafter be referred to as second speed pressure) from the second speed hydraulic clutch C2 and opened when a difference between the pressure at the disengaging side and that at the engaging side has become not more than a predetermined level due to the decrease of the second speed pressure at the disengaging side and the increase of the third and fourth speed pressures at the engaging side during a change of the second speed to the third speed and a change of the second speed to the fourth speed. Such a differential pressure-responding type discharge oil control valve is known from Japanese Patent Laid-open No. 82051/1986.

The fourth discharge oil control valve $19_4$, which is provided in the No. 4 discharge oil passage LD4 communicated with the third speed hydraulic clutch C3 when the third speed is shifted down to the second speed, is adapted to be pressed toward the left-hand opening side by the second speed pressure at the engaging side. In order that the control valve $19_4$ can also deal with a speed change from the fourth speed to the second speed, the third discharge oil passage LD3 communicated with the fourth speed hydraulic clutch C4 is communicated with a common inlet port $19_4a$ of the control valve $19_4$ through a branch passage LD3a so that the control valve $19_4$ is provided in the third discharge oil passage LD3 in parallel with the third discharge oil control valve $19_3$, whereby the fourth speed pressure at the disengaging side rapidly decreases due to the increase of the second speed pressure at the engaging side even when the fourth speed is shifted down to the second speed. Here in order to prevent it from happening that, when the third speed is shifted down to the second speed, the oil in the third speed hydraulic clutch C3 may be caused to be discharged from an orifice $20_3$ via said inlet port $19_4a$ from the fourth discharge oil passage LD4, and the third discharge oil passage LD3 before the fourth discharge oil control valve $19_4$ is opened and as a result, a pressure of the third speed pressure may become larger than the pressure decrease characteristic governed by an orifice $20_4$ in the fourth discharge oil passage LD4, a check valve $21_1$ for checking a back flow of the oil from the fourth discharge oil passage LD4 is interposed in the branch passage LD3a and a check valve $21_2$ for checking a back flow of the oil from the third discharge oil passage LD3 is likewise interposed in the fourth discharge oil passage LD4.

A speed reducing operation in the region of low degree of opening of the throttle can be carried out more smoothly if the pressure in the clutch at the disengaging side is rapidly reduced. Accordingly as known from Japanese Patent Laid-open No. 127956/1986, a fifth discharge oil control valve $19_5$, which is adapted to be opened with a low degree of opening of the throttle, is provided in the third discharge oil passage LD3 in parallel with the third discharge oil passage LD3 in parallel with the third discharge oil control valve $19_3$, and a sixth discharge oil control valve $19_6$, which is adapted to be opened with a low degree of opening of the throttle, in the fourth discharge oil passage LD4 in parallel with the fourth discharge oil control valve $19_4$.

The sixth discharge oil control valve $19_6$ is made of plunger pressing the throttle valve 17 and adapted to be moved toward the left-hand closing side by an operator $19_6a$ which is actuated in accordance with the degree of opening of the throttle. The fifth discharge oil control valve $19_5$ is also formed so that it is pressed toward the left-hand closing side by an operator $19_5a$ which is actuated in accordance with the degree of opening of the throttle. Thus, when the degree of opening of the throttle is low, these control valves $19_5$, $19_6$ are returned to the right hand opening positions, and the third speed pressure and fourth speed pressure decrease speedily by the discharge oil flowing through these valves $19_5$, $19_6$ when the speed is reduced from the third speed to the second speed, from the fourth speed to the third speed, and from the fourth speed to the second speed. The fifth discharge oil control valve $19_5$ is provided at the right end outer circumferential portion thereof with a small-diameter stepped portion $19_5b$, through which the third discharge oil passage LD3 is communicated with a right-hand atmospheric air communicating port when the degree of opening of the throttle is high, to speed up the reduction of the fourth speed pressure during the reduction of the speed from the fourth speed to a lower speed.

In general, the speed change characteristics are set so that, as degree of opening of the throttle increases, the speed changing is done in the higher vehicle speed region. In such a case, the quantity of variations of the number of revolutions per minute of the engine before and after the speed changing operation increases as the vehicle speed becomes higher. Therefore, when the speed is shifted down while a high degree of opening of the throttle, the pressure in the clutch at the high speed side is reduced early to form a neutral state for a short period of time below low speed travelling condition based on the increase of the pressure in the clutch at the low speed side has been established. In this neutral state, the engine should be raced to increase the engine revolution somewhat so that a difference between the revolutions at the input side of the low speed hydraulic clutch and those at the output side thereof decreases to have this clutch engaged smoothly. This enables the speed reduction to be carried out smoothly.

When the third speed has been shifted down to the first speed, the second discharge oil control valve $19_2$, which is interposed in the second discharge oil passage LD2 communicating with the third speed hydraulic clutch C3, is not opened. If the valve $19_2$ is left as it is, the discharging of the oil is done only from the orifice $20_2$ and the reduction of the third speed pressure delays. Consequently, it takes much time to establish the first speed transmission train G1 when the kick-down speed changing, in which the accelerator pedal is stepped to shift the third speed down to the first speed, is done, and the acceleration decreases. In order to prevent this inconvenience, the second discharge oil passage LD2 is constructed such that it may become communicated with an oil discharge port $10_1g$ through the annular recess $10_1f$ formed in the same valve $10_1$ when the first shift valve $10_1$ is in the first speed position. As a result, the oil in the third speed hydraulic clutch C3 is discharged from the oil discharge port $10_1g$ without throttle resistance when such kick-down speed changing is done, so that the first-speed transmission train G1 can be established without a time lag. The first speed hydraulic clutch C1 is constantly engaged in the D range and the first speed transmission train G1 is established when the third speed hydraulic clutch C1 is disengaged.

Figure 7:
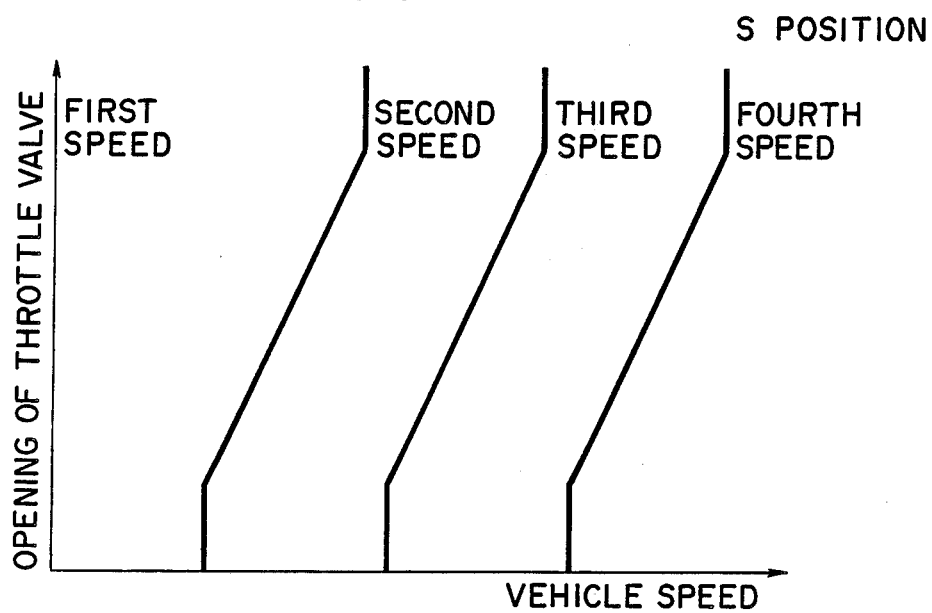

The above is a description of the construction of the oil passages formed in the D range. Also in the S range with the manual valve 9 set at the S position, the oil passages are also formed in the same manner as in the case where the manual valve 9 is in the D range. In this case, the speed change characteristics stored in the electronic control circuit 16, which is adapted to open and close the first and second open-air valves $15_1$, $15_2$ are changed to carry out a speed change automatically between the first to fourth speeds with the speed change characteristics shown in, for example, FIG. 7. The speed change characteristics shown in FIG. 7 are set so that the speed changing is done at higher speeds as compared with the speed changing done in accordance with the speed change characteristics shown in FIG. 6. Namely, the speed change characteristics shown in FIG. 7 are set so that they are suitable for the sporty driving and mountain driving.

In the D range, the seventh and eight oil passages L7, L8 are communicated with each other through the groove 9b in the manual valve 9, while in the S range, they are communicated with each other through the annular groove 9d in the same valve 9.

In the 2 range with the manual valve 9 set at the 2 position, the No. 14 oil passage L14 communicated with the No. 1 oil passage 1 through the groove 9e in the valve 9 is communicated with the No. 8 oil passage L8 through the annular groove 9d in the valve 9, and the line pressure is inputted into the second shift valve $10_2$ without passing through the first shift valve $10_1$. In the 2 position, both the first and second open-air valves $15_1$, $15_2$ are opened, and the second shift valve $10_2$ is in the right-hand second speed position. The No. 8 oil passage L8 is communicated with the No. 9 oil passage L9 and the oil is supplied to the second speed hydraulic clutch C2, so that the second speed transmission train G2 is established.

In the 2 range, the second oil passage L2 is communicated with an oil discharge port 9f, which consists of an axial bore formed in the manual valve 9, through a groove 9g in the same valve 9, and the oil is not supplied to the first speed hydraulic clutch C1. In the D and S ranges, No. 15 oil passage L15 communicated with the left end oil chamber $10_2 b$ in the second shift valve $10_2$, which has been communicated with the oil discharge port 9f via a groove 9h in the manual valve 9, is communicated with the No. 6 oil passage L6 through an annular groove 9i in the manual valve 9, so that the hydraulic pressure in the oil chamber $10_2 b$ becomes ready to be controlled by the second open-air valve $15_2$. The purpose of providing this arrangement is to establish the second speed transmission train G2 by setting the manual valve 9 to the 2 range, and thereby obtain a strong driving force even when an electric current has become unable to be supplied to the solenoids in the first and second open-air valves $15_1$, $15_2$ due to a certain accident to cause these valves $15_1$, $15_2$ to be left closed (fourth speed travelling condition in the D and S ranges). Namely, in the 2 range, even when the modulator pressure is inputted into the right end oil chamber $10_2 a$ in the second shift valve 10 due to the first open-air valve $15_1$ being closed, the modulator pressure is inputted into the left-hand oil chamber $10_2 b$ as well, due to the second open-air valve $15_2$ being closed.

Consequently, the pressing force at the left and right sides based on the modulator pressure is balanced, and the second shift valve $10_2$ is switched over to the right-hand second speed position due to the resilient force of the spring $10_2 c$, so that the supplying of the oil to the second speed hydraulic clutch C2 is done.

The purpose of supplying the oil to the second speed hydraulic clutch C2 through the second shift valve $10_2$ in the 2 range is to enable the third speed transmission train G3 to be established depending upon the program in the electronic control circuit 16 even in the 2 range. When the manual valve 9 is changed over to the 2 range while the vehicle travels at a high speed with the valve 9 set to the D and S ranges, the overrunning of the engine or a large speed change shock occurs in some cases. In order to prevent this inconvenience, it is necessary to develop a method capable of establishing the third speed transmission train G3 when the vehicle travels at, for example, a vehicle speed not lower than a predetermined level even in the 2 range.

In this case, it is possible to supply the oil to the second shift valve $10_2$ through the first shift valve $10_1$ by communicating the No. 1 oil passage L1 with the No. 2 oil passage L2 in the same manner as in the case where the manual valve is set in the D and S ranges. However, if the first speed hydraulic clutch C1 should fail in such a case to cause the oil leak therefrom, the line pressure decreases not only in the D and S ranges but also in the 2 range, so that all of the hydraulic clutches become unable to be engaged. As a result, it becomes impossible for the vehicle to travel forward.

In the 2 range in the above-described arrangement, the oil is supplied directly to the second shift valve $10_2$ through the No. 8 oil passage L8 without passing through the first shift valve $10_1$. Accordingly, the vehicle becomes able to travel forward at least in the 2 range, and the above-mentioned inconvenience does not occur.

In the R range with the manual valve 9 set at the R position, the first oil passage L1 is communicated with a No. 16 oil passage L16 which is communicated with the first shift valve $10_1$ via a groove 9j in the manual valve 9. In this case, the first open-air valve $15_1$ is closed, while the second open-air valve $15_2$ is opened (the third speed running condition in the D and S ranges), with the first shift valve 10 switched over to the left-hand second speed position. Accordingly, the No. 16 oil passage L16 is communicated through the annular groove $10_1 h$ in the valve $10_1$ with No. 17 oil passage L17 communicating with the left end oil chamber 11a in the servo valve 11. The servo valve 11 is moved to right against the spring 11b by the line pressure inputted thereinto through the No. 17 oil passage L17. Consequently, the selector gear 6 joined to the servo valve 11 is switched over to the right-hand reverse position, in which the No. 17 oil passage L17 is communicated with No. 18 oil passage L18, which is communicated with the manual valve 9, through the axial bore 11c in the servo valve 11 which is communicated with the oil chamber 11a.

In the R range of the manual valve 9, the No. 18 oil passage L18 is communicated with the No. 13 oil passage L13 which is communicated with the fourth speed hydraulic clutch C4 through the groove 9c, and the supplying of the oil to the fourth speed hydraulic clutch C4 and the switching over of the selector gear 6 to the reverse position are carried out to establish the reverse transmission train GR.

When the servo valve 11 is moved to right to the reverse position, the No. 19 oil passage L19 communicating with the left end oil chamber $10_3b$ in the third shift valve $10_3$ is communicated with the No. 14 oil passage L14 through a groove 11d and a spring chamber 11e in the servo valve 11, and the oil chamber $10_3b$ is opened to the atmospheric air through a discharge oil port 9k which is communicated with the No. 14 oil passage L14 through the annular groove 9a in the manual valve 9 when the valve 9 is in the R range. If the servo valve 11 returns late to the advancing position as will be described later, when the manual valve 9 is switched from the R range to the D and S ranges, the No. 1 oil passage L1 is communicated with the No. 14 oil passage L14 in the D and S ranges as mentioned above. As a result, the line pressure is inputted from the No. 14 oil passage L14 into the oil chamber $10_3b$ through the No. 19 oil passage L19 in contrast to the above-mentioned case so that the third shift valve $10_3$ is retained forcibly in the right-hand third speed position. The reasons are as follows.

In a transmission in which a speed change operation is controlled by the electronic control circuit, a normal speed change control operation becomes impossible when there occurs an abnormality in the input signal system for signals from the vehicle speed sensor 16b or the like. In such a transmission, the self-checking functions for detecting the abnormality of the input signal system are added generally to the electronic control circuit 16 so as to control a speed changing operation so that a maximum speed can be attained when the abnormality has been detected. If this is applied to the illustrated embodiment, the fourth speed travelling condition is obtained, i.e., the first and second open-air valves $15_1$, $15_2$ are closed.

Therefore, if the manual valve 9 is switched over from the R range to the D and S ranges with an abnormality occurring in the input signal system, the oil continues being supplied to the fourth speed hydraulic clutch C4. In this case, the oil is discharged from the oil chamber 11a in the servo valve 11 to an oil discharge port 9 through the No. 17 oil passage L17, an annular groove $10_1h$ in the first shift valve $10_1$ being in the second speed position, the No. 16 oil passage L16 and the groove 9j in the manual valve 9. When the viscosity of the oil at a low temperature is high, the discharging of the oil from the oil chamber 11a, i.e. the movement of the servo valve 11 to the left-hand advancing position is delayed so that the second gear 6 still remains in the reverse position in some cases even after the manual valve has been switched over to the D and S positions or ranges. This combined with the supplying of the oil to the fourth speed hydraulic clutch C4 keeps the reverse transmission train GR established. When the manual valve 9 is switched over to the D and S positions, the oil is supplied to the first speed hydraulic clutch C1 as well, so that the reverse driving system GR and first speed driving system G1 are established simultaneously. This causes the clutch discs in the first and the fourth speed hydraulic clutches C1, C4 to be burnt and worn early.

However, if the movement of the servo valve 11 in the above arrangement to the advancing position is delayed, the line pressure is inputted into the left end oil chamber $10_3b$ in the third shift valve $10_3$ through the No. 19 oil passage L19. Accordingly, even when the modulator pressure is inputted into the right end oil chamber $10_3a$ in the third shift valve $10_3$ owing to the closing of the second open-air valve $15_2$, the rightward pressing force based on the line pressure and the resilient force of the spring $10_3c$ overcomes the leftward pressing force based on the modulator pressure, so that the third shift valve $20_3$ is held in the right-hand third speed position with the discharging of the oil from the fourth speed hydraulic clutch C4 and the supplying of the oil to the third speed hydraulic clutch C3 carried out properly. Consequently, the third speed transmission train G3 is established, and the above-mentioned inconveniences do not occur.

In the N range with the manual valve 9 set at the N position, the oil is supplied from the No. 1 oil passage L1 to the modulator valve 13 only, and not at all to the oil passages on the downstream side of the manual valve 9. The same applies to the P range with the manual valve 9 set at the P position.

The above are the explanations about the formations of passages in various ranges of the manual valve 9. The clutch 22 contained in the hydraulic torque converter 3 will now be described.

Referring to FIG. 2, the clutch 22 mechanically connects together, for example, an input case 3a at the input side of the hydraulic torque converter 3, and, for example, a turbine wheel 3b at the output side thereof. The clutch 22 is provided with a clutch plate 22a in a clearance between the input case 3a and turbine wheel 3b. The clutch plate 22a is connected to the turbine wheel 3c via a damper spring 22b, in such a manner that the clutch plate 22a can be axially moved. The inner space of the torque converter 3 is divided by the clutch plate 22a into a wheel housing chamber 23 and a back pressure chamber 24 at the side of the input case 3a so that the torque converter 3 can be switched by a control valve 25, which will be described later, to a clutch-disengaged state in which the oil is supplied from the back pressure chamber 24 to the inner space, and a clutch-engaged state in which the oil is supplied from the housing chamber 23 thereto. In the clutch-engaged state, the clutch plate 22a is frictionally engaged with the input case 3a by an engaging force corresponding to a difference between the internal pressure in the housing chamber 23 (which will hereinafter be referred to as Pa) and that in the back pressure chamber 24 (which will hereinafter be referred to as Pb).

The control valve 25 can be switched to a right-hand disengaging position (position shown in the drawing) in which the oil is supplied to the back pressure chamber 24 with No. 20 oil passage L20, which is communicated with the regulator valve 25, joined to No. 21 oil passage L21, which is communicated with the back pressure chamber 24, and a left-hand engaging position in which the oil is supplied to the housing chamber 23 with the No. 20 oil passage L20 joined to No. 22 oil passage L22 which is communicated with the housing chamber 23. The modulator pressure (which will hereinafter be referred to as Pm) is inputted into the right end oil chamber 25a in the control valve 25 through the No. 4 oil passage L4. No. 23 oil passage L23 communicating with the No. 4 oil passage L4 through an orifice $26_1$ is communicated with the left end oil chamber 25b in the control valve 25, and a third electromagnetic normally-closed open-air valve $15_3$ is connected to the No. 23 oil passage L23. When the valve $15_3$ is opened, the control valve 25 is switched over to the engaging position against the spring 25c due to the difference between the pressures in the two oil chambers 25a, 25b so that the clutch 22 is engaged.

Referring to the drawing, a first relief valve 27 consisting of a check valve is interposed in the fifth discharge oil passage LD5 communicating with the housing chamber 23 so as to regulate Pa to a comparatively high predetermined level. An oil cooler 28, an oil reservoir 29, and relief valves 30₁, 30₂ are provided so as to prevent the pressures applied to the oil cooler 28 and portions to be lubricated from increasing excessively.

The engaged state of the clutch 22 is switched to a directly-engaged state in which the input and output sides of the clutch 22 are connected directly and a slipping state in which the slipping of the input and output sides is allowed due to the variations in the engaging force which are based on the increase and decrease of the difference between the pressures Pa, Pb. The control apparatus is formed as follows so as to control this differential pressure in such a manner that the differential pressure varies in accordance with the travelling condition of the vehicle.

No. 24 oil passage L24 communicating with the No. 21 oil passage L21 in the engaging position of the control valve 25, and No. 25 oil passage L25 branching off from the No. 22 oil passage L22 are joined to each other via a second relief valve 31 to form a communication passage by which the back pressure chamber 24 and the housing chamber 23 are communicated with each other. The sixth discharge oil passage LD6 which is parallel to the first relief valve 27 is communicated with the fifth discharge oil passage LD5, and a switch valve 32 is provided in the discharge oil passage LD6. This switch valve 32 is adapted to be pressed toward the left-hand closing side by a throttle pressure (which will hereinafter be referred to as P ) inputted from the throttle valve 17 into a right end oil chamber 32a, and toward the right-hand opening side by Pm inputted into a left end oil chamber 32b through No. 26 oil passage L26, which is connected to the No. 4 oil passage L4 via an orifice 26₂, and a spring 32c. A fourth electromagnetic normally-closed open-air valve 15₄ is connected to the No. 26 oil passage L26. Thus, only when the fourth valve 15₄ is opened with P not lower than a predetermined level Ps (with the degree of opening of the throttle not lower than a predetermined level s), the switch valve 32 is closed. When Pm is being inputted into the left end oil chamber 32b with the fourth open-air valve 15₄ closed, the switch valve 32 is not closed even if the throttle is fully opened.

The second relief valve 31 is formed so as to serve as a differential pressure-responding valve which is pressed toward the right-hand opening side by a hydraulic pressure Pa inputted thereinto through No. 27 oil passage L27, which is communicated with the sixth discharge oil passage LD6 when the switch valve 32 is opened, and toward the left-hand closing side by a hydraulic pressure Pb inputted into the valve 31 through the pilot oil passage L24a communicating with the No. 24 oil passage L24. The second relief valve 31 is pressed toward a closing side by P from the throttle valve 17, and toward an opening side by Pm inputted thereinto through the No. 26 oil passage L26, and a spring 31a. In the following equations, S1 equals a pressure-receiving area for Pa, Pb in the second relief valve 31, S2 is a pressure-receiving area for P , Pm, and F is the force of the spring 31a. The force applied to the second relief valve 31 is expressed by the equation, PaS1+PmS2+F=PbS1+P S2

Therefore, the following relational expression is established:

$$Pa - Pb = \frac{S2}{S1} P - \frac{F}{S1} - \frac{S2}{S1} Pm \quad (1)$$

If the fourth open-air valve 15₄ is closed in a state in which the control valve 25 is changed over to the engaging position, as described above, by the opening of the third open-air valve 15₃ so as to effect an engaging operation of the clutch 22, the switch valve 32 is held in the open state, and Pa is set to a relatively low pressure by the discharging of oil via the sixth oil discharge passage LD6. In addition, oil is supplied to the back-pressure chamber 24 via the second relief valve 31, and the differential pressure of Pa and Pb increases with an increase in the degree of throttle opening in accordance with the equation (1) above. Consequently, the engaging force of the clutch increases in proportion to an increase of the output torque of the engine in correspondence with the throttle opening. Hence, the clutch 22 operates in a slipping stage such that the speed ratio of the liquid torque converter 3 can be held in the vicinity of 0.92–0.93 regardless of an increase or decrease in the output torque.

In addition, even if the fourth open-air valve 15₄ is opened, in the region where the throttle opening is Θs or below, the differential pressure of Pa and Pb varies in accordance with equation (1) since the switch valve 32 is held in the open state. In this case, however, since the input of Pm to the second regulator valve 31 is stopped by the opening of the fourth open-air valve 15₄, the term Pm in equation (1) becomes zero, with the result that the differential pressure of Pa and Pb is increased. As a result, the clutch 22 operates in a pseudo - directly engaged state such that the speed ratio of the fluid torque converter 3 is barely maintained at 1.0.

Figure 9:
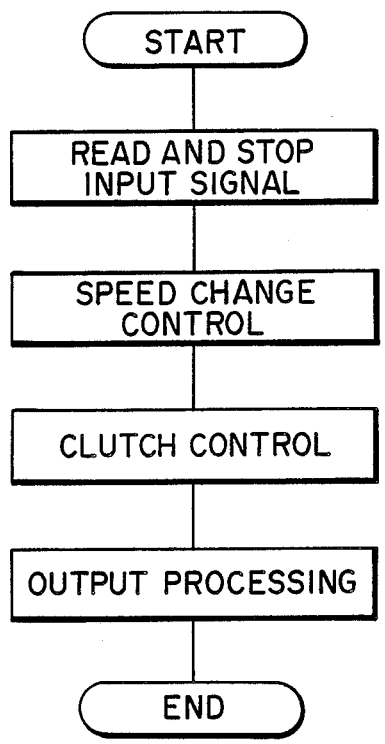
FIG. 9 is a flowchart illustrating an overall program of the electronic control circuit of the present invention.

When the fourth open-air valve 15₄ is opened and the throttle opening becomes Θs or greater, the switch valve 32 is closed, and the discharge of oil via the sixth oil discharge passage LD6 is stopped, with the result that Pa is held at a value of relatively high pressure set by the first relief valve 27. In addition, the input of Pa to the second relief valve 31 via the No. 27 oil passage L27 and the input of Pm thereto via the No. 26 oil passage L26 are stopped. The second relief valve 31 is moved against spring 31a to the closing position by P (Ps or greater). Hence, the supply of oil to the back-pressure chamber 24 is stopped, and Pb becomes a value close to the atmospheric pressure. Thus, since the differential pressure of Pa and Pb becomes large, the clutch 22 is operated in a directly engaged state. The opening and closing of the third and fourth open-air valves 15₃, 15₄ are controlled by the electronic control circuit 16, in the same way as the first and second open-air valves 15₁, 15₂. In accordance with a program shown in FIG. 9, the control circuit 16 executes the reading and storing of input signals such as the throttle opening, a speed-change control routine, and a clutch control routine at predetermined time intervals. The control circuit 16 then executes the output processing in response to instructions for opening and closing the first and second open-air valves 15₁, 15₂ outputted in the speed-change control routine as well as instructions for opening and closing the third and fourth open-air valves 15₃, 15₄ outputted in the clutch control routine. The control circuit 16 also controls the energization of the solenoids 15a of the air-releasing valves 15₁, 15₂, 15₃, 15₄ via the respective drive circuits 15b. The stage of this output processing is maintained until the next output processing.

Figure 8:
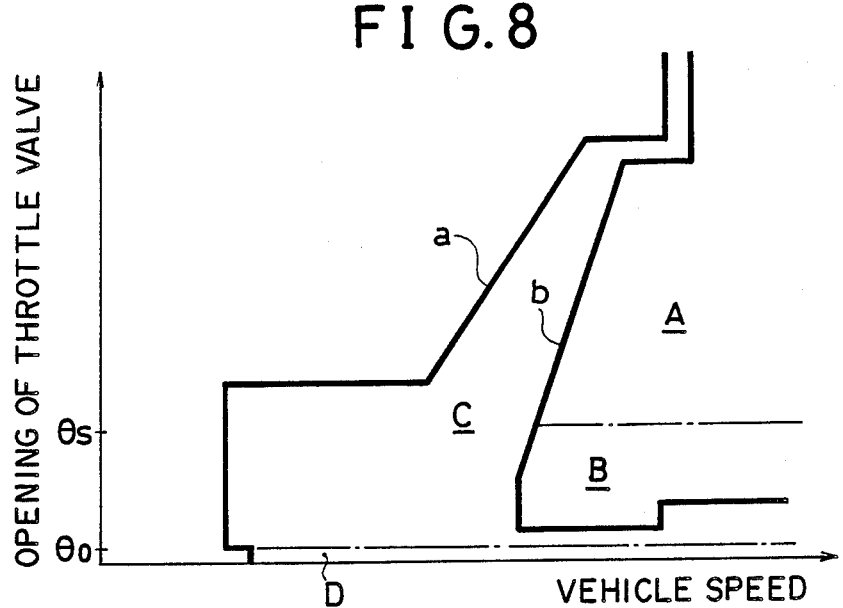
FIG. 8 is a diagram of operating characteristics of the clutch for the fluid torque converter.

At this point, in the clutch control routine, the control circuit 16 outputs instructions for closing both the third and fourth open-air valves $15_3$, $15_4$ when in a range other than the D range, and outputs, when in the D range, an instruction for opening the third open-air valve $15_3$ in a region on the higher-speed side from a line a in FIG. 8, in accordance with clutch operating characteristics shown in the drawing. As described above, the control valve 25 is then changed over to the engaging position to effect an engaging operation of the clutch 22, and, in the region surrounded by a line b in the drawing, an instruction for opening the fourth open-air valve $15_4$ is outputted.

Thus, the clutch 22 operates in the directly engaged state in a region A in FIG. 8, where the throttle opening is $\Theta_s$ or above, in the region surrounded by the line b. It operates in the pseudo-directly engaged state in a region B where the throttle opening is below $\Theta_s$, and operates in a slipping state in a region C between the lines a and b, and variations in torque generated in a region of a relatively low vehicle speed or in a region of a relatively low throttle opening are absorbed effectively by the slipping of the clutch 22.

When the vehicle is run while reducing speed by setting the throttle opening to a minimum opening of $\Theta_O$ or lower which is close to a fully closed stage, variations in torque transmitted from the engine present no problem. Therefore, even in a region between the line a and the line b, if in a region D below $\Theta_O$, the speed ratio of the torque converter 3 is fed back to duty-control the fourth open-air valve $15_4$ in such a manner that the valve-opening time thereof per unit time may be varied in accordance with its deviation from a target speed ratio, and the speed ratio is thus, maintained in the vicinity of 1.02–1.03 to keep the braking operation of the engine adequately effective and, at the same time, prevent vibration of the vehicle body from occurring at the time of application of the engine brakes.

The speed ratio of the fluid torque converter 3 is determined by the following: The number of revolutions on the output side of the torque converter 3, i.e., that of an input shaft 1a of the auxiliary transmission 1 is calculated from the vehicle speed and the gear ratio of the transmission's present stage, and this number of revolutions is compared with the number of revolutions of a crankshaft on the input side of the torque converter 3 which is detected by the engine speed sensor 16d.

With the speed-control routine, the D range map in which the speed-change characteristics shown in FIG. 6 have been stored, is retrieved, and instructions for opening and closing the first and second open-air valves $15_1$, $15_2$ in response to the retrieved results are given, while in a range other than the D and S ranges, instructions for opening and closing the first and second open-air valves $15_1$, $15_2$, which are predetermined for each range, are given.

In addition, a signal from a mode selection switch 16e consisting of a self-resetting-type pushbutton switch is inputted to the electronic control circuit 16. The operation of the switch 16e selects a mode for allowing the establishment of the maximum-speed speed stage in the S range, i.e., the fourth-speed transmission train G4 (this mode is hereafter referred to as the $S_4$ mode) and another mode for inhibiting the establishment of the fourth-speed transmission train G4 (this mode is hereafter referred to as the $S_3$ mode). When the $S_4$ mode is selected, an automatic speed change for the first to fourth speed is effected in response to the speed-change characteristics shown in FIG. 7. When the $S_3$ mode is selected, however, it is such that the third-speed transmission train G3 is established even in the fourth-speed range shown in FIG. 7.

The details of the speed-change routine are as shown in FIG. 10. In S1, determination is made as to whether or not the range is the S range. If it is not the S range, the operation proceeds to S2, in which a first flag (hereafter referred to as $F_1$) is set to 0. In this case, if the range is the P or N range, the operation proceeds from S2 to S3 where the determination is made as to whether or not the range is the D range, to S4 where the determination is made as to whether or not the range is the 2 range, and to S5 where the determination is made as to whether or not the range is in the R range, before proceeding to S6. Here, opening/closing instructions in accordance with the P and N ranges, i.e., the instructions for closing both the first and second open-air valves $15_1$, $15_2$, are given. If the range is the R range, the operation proceeds from S5 to S7, in which opening/closing instructions in accordance with the R range, i.e., instructions for closing the first open-air valve $15_1$ and opening the second open-air valve $15_2$, are given. If the range is the 2 range, the operation proceeds from S4 to S8, in which opening/closing instructions in accordance with the 2 range, i.e., instructions effecting, as a general rule, both the first and second open-air valves $15_1$, $15_2$ to be opened, and under certain conditions, the first open-air valve $15_1$ to be closed while making the second open-air valve $15_2$ opened, are given. In addition, if the range is the D range, the operation proceeds from S3 to S9, and after retrieving the D range map, opening/closing instructions in accordance with the retrieved information are given in S10.

If the range is the S range, the operation proceeds from S1 to S11, in which the S range map is retrieved, and opening/closing instructions in accordance with the retrieved results are issued in S12. The operation then proceeds to S13, and the determination is made as to whether or not $F_1$ is 0. In this case, if a range other than the S range had been previously selected, there is established $F_1=0$ in S2, so that the operation proceeds from S13 to S14 to set a second flag (hereafter referred to as $F_2$) to 0, and then proceeds to S15. Here S3 mode processing, i.e., processing in which the opening/closing instructions given at S12 and applicable to the fourth-speed range are converted to instructions corresponding to the third-speed range, is effected. The operation then proceeds further to S16, in which $F_1$ is rewritten to 1.

Thus, when a change-over is effected from another range to the S range, a speed change is effected in the $S_3$ mode, and there is established $F_1=1$ in S16. Therefore, while the vehicle is running in the S range, the operation subsequently proceeds from S13 to S17, in which determination is made as to whether or not the mode selection switch 16e has been depressed. If the switch 16e has not been depressed, the operation proceeds to S18, in which determination is made as to whether or not $F_2$ is 0. In this case, since $F_2$ has been rewritten to 0 in S14 and still remains as such, the operation proceeds to S19, which maintains a state in which the speed change in the $S_3$ mode is effected.

If the mode selection switch 16e is depressed once while the vehicle is running in the S range, the operation proceeds from S17 to S20 to make determination as to whether or not $F_2$ is 0. In this case, since $F_2$ is 0 as in the case described above, the operation proceeds from S20 to S21 to rewrite $F_2$ to 1. Thereafter, unless the switch 16e is depressed, the operation proceeds from S17 to S18, in which the answer is determined to be NO. Accordingly, the $S_3$ mode processing is not effected, so that a speed change in the $S_4$ mode is effected in accordance with opening/closing instructions given in S12. However, if the switch 16e is depressed again, the operation proceeds from S17 to S20 and to S22 since, in this case, $F_2$ has been rewritten to 1 in S21, and after rewriting $F_2$ to 0, the operation proceeds to S19.

Until the switch 16e is depressed again thereafter, the operation proceeds from S17 to S18 to S19, and the $S_3$ mode processing is carried out such that a speed change in the $S_3$ mode can be performed. Hence, while the vehicle is running in the S range, a change-over from one to the other is effected between the $S_4$ mode and the $S_3$ mode each time the switch 16e is depressed.

In addition, even if the $S_4$ mode has been selected, when a change-over is effected again to the S range, the operation proceeds from S13 to S14, and there is established $F_2=0$. Therefore, the $S_3$ mode is selected and, in other words, a change-over is substantially effected from the $S_4$ mode to the $S_3$ mode if the selection of the S range is cancelled. If a change-over is effected to the S range during high-speed running of the fourth-speed stage in the D range, a shift-down to the third-speed stage is inevitably effected. For a user who usually drives the vehicle by using the D range, it is possible to use the S range as a speed-reducing range at the time of high-speed running without requiring any switching operation.

As shown in the drawings, oil filters 33 are disposed upstream of the first to fourth open-air valves $15_1 \ldots, 15_4$, the modulator valve 13 and the throttle valve 17.

As has been described above, in accordance with the present invention, a speed change from the minimum-speed stage up to the maximum-speed stage is effected in a first automatic speed-change range or a second automatic speed-change range wherein the speed-change characteristics are set differently for each. A user who prefers economical driving can thus, select a first automatic speed-change range while a user who prefers sporty driving can select a second automatic speed-change range to obtain driving that meets his or her preference. Furthermore, if an inhibition mode is selected, the second automatic speed-change range can be used as a speed-reducing range during high-speed running in the first automatic speed-change range. Hence, the present invention has an advantage in that it enhances the operational convenience.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A method of controlling an automatic transmission for a vehicle having a first speed-change range and a second speed-change range as ranges for effecting the automatic speed change of said transmission, each speed change range having change points as a function of vehicle operating parameters, wherein when said first speed-change range has been selected, the automatic speed change from a minimum-speed stage to a maximum-speed stage is effected in accordance with first predetermined speed-change characteristics such that the transmission speed changes in response to operating parameters of said vehicle, said method comprising the steps of:

effecting an automatic speed change from the minimum-speed stage to the maximum-speed stage in accordance with the second speed-change characteristics when the second speed-change range is selected, wherein speed changes in the second speed-change range occur at higher vehicle speeds than corresponding speed-changes in the first speed change range;

selecting an inhibiting or non-inhibiting mode of operation for the second speed range, wherein when the inhibiting mode is selected, the transmission is prevented from speed-changing to the maximum speed-stage; and switching from the inhibiting mode to the non-inhibiting mode only when the second automatic speed-change range has been selected, and wherein when the selection of the second speed-change range has been changed to the first speed-change range, a change-over to the inhibiting mode can be effected even if the non-inhibiting mode has been selected, wherein change-over between the first speed-change range and the second speed-change range is made by operating a shift lever.

* * * * *